United States Patent
Lebzelter et al.

(10) Patent No.: US 9,153,828 B2
(45) Date of Patent: Oct. 6, 2015

(54) METHOD TO DIAGNOSE FUEL CELL HUMIDIFICATION PROBLEMS

(71) Applicant: GM GLOBAL TECHNOLOGY OPERATIONS LLC, Detroit, MI (US)

(72) Inventors: Derek R. Lebzelter, Fairport, NY (US); Donald H. Keskula, Fairport, NY (US); Todd K. Preston, Rochester, NY (US); John P. Nolan, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 494 days.

(21) Appl. No.: 13/730,375

(22) Filed: Dec. 28, 2012

(65) Prior Publication Data

US 2014/0186726 A1  Jul. 3, 2014

(51) Int. Cl.
  *H01M 8/04* (2006.01)
  *H01M 8/02* (2006.01)

(52) U.S. Cl.
  CPC ...... *H01M 8/04492* (2013.01); *H01M 8/04507* (2013.01); *H01M 8/04686* (2013.01); *H01M 8/04522* (2013.01); *H01M 8/04828* (2013.01); *H01M 8/04835* (2013.01); *H01M 8/04992* (2013.01); *Y02E 60/50* (2013.01)

(58) Field of Classification Search
  CPC .............. H01M 8/04; H01M 8/04492; H01M 8/04507; H01M 8/04522; H01M 8/04828; H01M 8/04835; H01M 8/04992
  See application file for complete search history.

(56) References Cited

U.S. PATENT DOCUMENTS

| | | | |
|---|---|---|---|
| 6,376,111 B1* | 4/2002 | Mathias et al. | 429/413 |
| 2006/0263653 A1* | 11/2006 | Sinha et al. | 429/13 |
| 2008/0182139 A1* | 7/2008 | Ganapathy et al. | 429/13 |
| 2008/0206610 A1* | 8/2008 | Saunders et al. | 429/13 |
| 2009/0075127 A1* | 3/2009 | Lienkamp et al. | 429/13 |
| 2009/0081489 A1* | 3/2009 | Frost et al. | 429/13 |
| 2010/0028728 A1* | 2/2010 | Clingerman et al. | 429/13 |
| 2011/0076582 A1* | 3/2011 | Zhang et al. | 429/432 |
| 2011/0113857 A1* | 5/2011 | Sinha | 73/29.02 |

OTHER PUBLICATIONS

Lebzelter, Derek R. U.S. Appl. No. 13/197,535, filed Aug. 3, 2011, titled Utilization of HFR-Based Cathode Inlet RH Model in Comparison to Sensor Feedback to Determine Failed Water Vapor Transfer Unit and Utilize for a Diagnostic Code and Message.

* cited by examiner

*Primary Examiner* — Kenneth Douyette
(74) *Attorney, Agent, or Firm* — John A. Miller; Miller IP Group, PLC

(57) ABSTRACT

A system and method for determining if an RH sensor that measures the relative humidity of cathode inlet air provided to a fuel cell stack or an HFR circuit that measures stack water content is operating properly. The method provides the cathode inlet air through a WVT unit that increases the water content of the cathode inlet air. The method uses a water buffer model for determining the water content of the fuel cell stack based on inputs from a plurality of system components and revises a water transfer model using the HFR humidification signal or the RH signal to correct for WVT unit degradation. The method determines whether the RH sensor or the HFR circuit is operating properly, such as by determining if the HFR humidification signal is increasing at a rate that is faster than what the stack water content is able to increase.

20 Claims, 3 Drawing Sheets

METHOD TO DIAGNOSE FUEL CELL HUMIDIFICATION PROBLEMS

BACKGROUND OF THE INVENTION

1. Field of the Invention

This invention relates generally to a system and method for determining if a relative humidity (RH) sensor that measures the relative humidity of cathode inlet air provided to a fuel cell stack or a high frequency resistance (HFR) measuring circuit that measures stack water content is operating properly and, more particularly, to a system and method for determining whether an RH sensor or an HFR circuit is operating properly by determining whether the output signal from the RH sensor or the HFR circuit is valid.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membrane within a fuel cell needs to have sufficient water content so that the ionic resistance across the membrane is low enough to effectively conduct protons. Membrane humidification may come from the stack water by-product or external humidification. The flow of reactants through the flow channels of the stack has a drying effect on the cell membranes, most noticeably at an inlet of the reactant flow. However, the accumulation of water droplets within the flow channels could prevent reactants from flowing therethrough, and may cause the cell to fail because of low reactant gas flow, thus affecting stack stability. The accumulation of water in the reactant gas flow channels, as well as within the gas diffusion layer (GDL), is particularly troublesome at low stack output loads.

As mentioned above, water is generated as a by-product of the stack operation. Therefore, the cathode exhaust gas from the stack will typically include significant water vapor and liquid water. It is known in the art to employ a water vapor transfer (WVT) unit to capture some of the water content in the cathode exhaust gas, and use that water content to humidify the cathode input airflow. Water in the cathode exhaust gas at one side of the water transfer elements within the WVT unit is absorbed by the water transfer elements and transferred to the cathode air stream at the other side of the water transfer elements. A typical WVT unit includes membranes made of a special material where the wet flow on one side of the membrane is transferred through the membrane to humidify the dry flow on the other side of the membrane.

As discussed above, it is generally necessary to control stack water content so that the membranes in the stack have the proper proton conductivity, but where the flow channels do not become blocked by ice if the water freezes during system shut-down. It is known in the art to provide an RH sensor in the cathode air inlet of a fuel cell system to measure the humidification of the cathode inlet gas stream as it enters the stack. Using the measured inlet relative humidity and the water species balance, or mass balance of water, the RH profile of the fuel cell system, including cathode air outlet flow, can be estimated. The ability of the RH sensor to provide an accurate reading of the RH is determined by the cost and complexity of the sensor. It is typical desirable to limit the cost of the sensor, which reduces its accuracy.

Another technique for determining stack water content is known in the art as high frequency resistance (HFR) humidification measuring, where high frequency in this context is typically 300 Hz-10 kHz. HFR humidification measurements are generated by providing a high frequency component or signal on the electrical load of the stack so that a high frequency ripple is produced on the current output of the stack. The resistance of the high frequency component is then measured by a detector, which is a function of the level of humidification of the membranes in the stack. High frequency resistance is a well-known property of fuel cells, and is closely related to the ohmic resistance, or membrane protonic resistance, of the fuel cell membrane. Ohmic resistance is itself a function of the degree of fuel cell membrane humidification. Therefore, by measuring the HFR of the fuel cell membranes of a fuel cell stack within a specific band of excitation current frequencies, the degree of humidification of the fuel cell membrane may be determined. This HFR measurement allows for an independent measurement of the fuel cell membrane humidification, which may eliminate the need for RH sensors.

Models are sometimes employed in fuel cell systems for determining the water content in the fuel cell stack. For example, it is known to employ a water buffer model that estimates the amount of water that is in the stack at any given time. Also, a water transfer model is known that estimates the water transfer in the WVT unit using the water buffer model. The water transfer model can estimate the cathode air inlet relative humidity and using that value and various operating parameters of the fuel cell stack, such as temperature, cathode stoichiometry, pressure, stack current density, etc., estimate the relative humidity of the cathode outlet gas by accounting for the water buffers within the fuel cell stack. The MEA and diffusion media within the stack have some water carrying capacity so changes in the above conditions do not immediately translate into the steady state value of outlet humidity. Using the estimation of the relative humidity of the cathode outlet gas and the water transfer capability of the WVT unit, the model then revises the estimation of the relative humidity of the cathode inlet air.

If the stack operating conditions require a different relative humidity for the cathode outlet gas, then the system control can change the temperature of the cooling fluid flowing through the stack to change the temperature of the stack, which changes how much water the cathode air can absorb. Particularly, if the stack temperature increases, the ability of the cathode air flowing through the stack to saturate with water increases where the absolute humidity of the cathode air may stay the same, but the relative humidity of the cathode air decreases.

The WVT unit degrades over time where its effectiveness to transfer water from the cathode outlet gas to the cathode inlet air decreases. This phenomenon may be the result of various things, such as membrane contamination, membrane degradation, etc. For those systems that employ an RH sensor between the WVT unit and the fuel cell stack and/or an HFR measuring circuit, the output of the sensor or circuit can be used to correct the water transfer model so that the estimate of the relative humidity of the cathode inlet air is adjusted as the WVT unit degrades. However, the RH sensor or HFR circuit themselves sometimes fail and/or drift where the sensor or circuit may not be giving an accurate reading of the water content of the cathode inlet air. In this circumstance, the model may be adjusted based on the inaccurate relative humidity measurement, causing stack operation performance problems. For example, if the RH sensor or HFR circuit is giving a measurement of the relative humidity of the cathode inlet air that is lower than the actual value, the water transfer model may adjust the temperature of the fuel cell stack lower, compensating for a perceived stack dry-out. This would cause the actual cathode inlet and outlet relative humidities to go up to a higher level than desired, which could cause stack instability as a result of flow channel flooding.

Additionally, other sensors or devices in the system may malfunction, such as coolant temperature sensors, cathode air flow meter, pressure sensors, etc. Therefore, the RH sensor or HFR circuit output may indicate WVT unit degradation, where the sensor measurement is accurate, but the system control may not interpret the change properly.

U.S. patent application Ser. No. 13/197,535, titled, Utilization of HFR-Based Cathode Inlet RH Model in Comparison to Sensor Feedback to Determine Failed Water Vapor Transfer Unit and Utilize for a Diagnostic Code and Message, filed Aug. 3, 2011, assigned to the assignee of this application and herein incorporated by reference, discloses a system and method to detect a crossover leak in a WVT unit using HFR and RH sensor measurements.

SUMMARY OF THE INVENTION

In accordance with the teachings of the present invention, a system and method are disclosed for determining if a relative humidity (RH) sensor that measures the relative humidity of cathode inlet air provided to a fuel cell stack or a high frequency resistance (HFR) measuring circuit that measures stack water content is operating properly. The method includes providing the cathode inlet air through a water vapor transfer (WVT) unit prior to entering the fuel cell stack that increases the water content of the cathode inlet air. The method also provides a cathode outlet gas to the WVT unit to provide humidification for increasing the water content of the cathode inlet air. The method uses a water buffer model for determining the water content of the fuel cell stack based on inputs from a plurality of system components and revises a water transfer model using the HFR humidification signal or the RH sensor signal to correct for WVT unit degradation. The method determines whether the RH sensor or the HFR circuit is operating properly, such as by determining if the HFR humidification signal is increasing at a rate that is faster than what the stack water content is able to change.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for identifying HFR circuit or RH sensor failure in a fuel cell system is merely exemplary in nature, and is in no way intended to limit the invention or its applications or uses.

Figure 1:
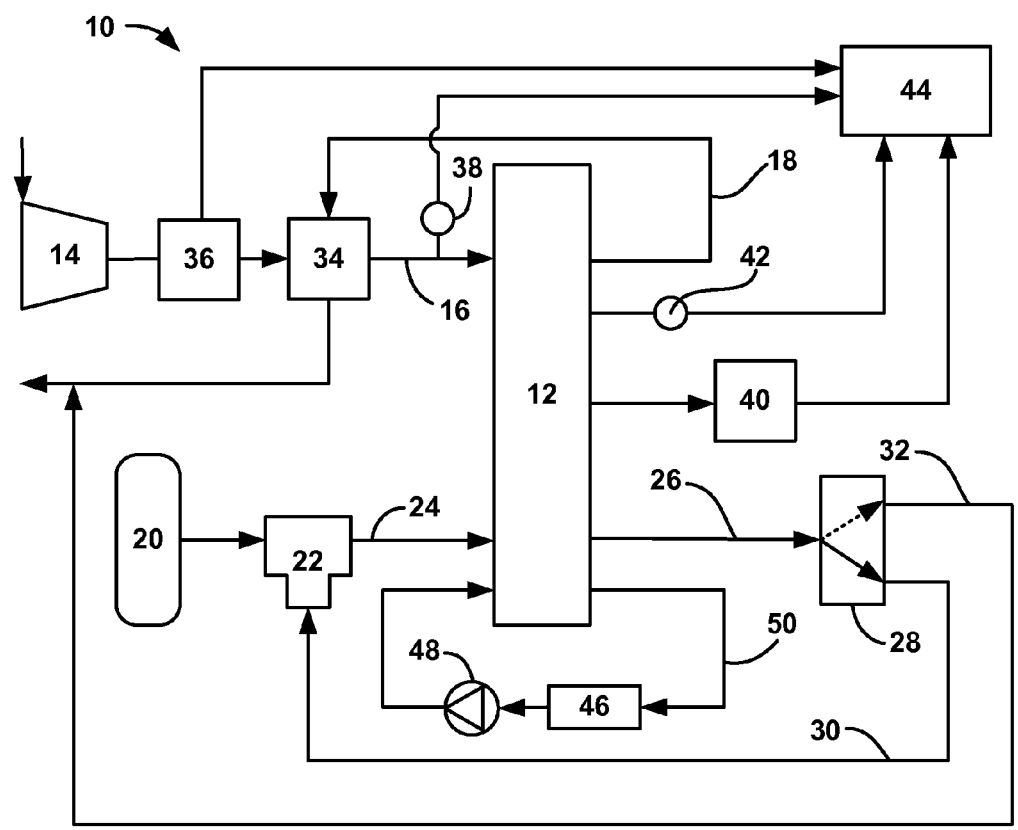
FIG. 1 is a simplified schematic block diagram of a fuel cell system.

FIG. 1 is a schematic block diagram of a fuel cell system 10 including a fuel cell stack 12. A compressor 14 provides an airflow to the cathode side of the fuel cell stack 12 on a cathode input line 16 through an air flow meter 36 that measures the cathode air flow and a water vapor transfer (WVT) unit 34 that humidifies the cathode input air. A cathode exhaust gas is output from the stack 12 on a cathode exhaust gas line 18 that directs the cathode exhaust gas to the WVT unit 34 to provide the humidity to humidify the cathode input air. An RH sensor 38 is provided in the cathode input line 16 to provide an RH measurement of the cathode input airflow after it has been humidified by the WVT unit 34. A temperature sensor 42 is provided as a general representation of one or more temperature sensors that may be employed in the system 10 that are operable to obtain the temperature of the fuel cell stack 12 and/or various fluid flow regions in the system 10.

The fuel cell system 10 also includes a source 20 of hydrogen fuel, typically a high pressure tank, that provides hydrogen gas to an injector 22 that injects a controlled amount of the hydrogen gas to the anode side of the fuel cell stack 12 on an anode input line 24. Although not specifically shown, one skilled in the art would understand that various pressure regulators, control valves, shut-off valves, etc. would be provided to supply the high pressure hydrogen gas from the source 20 at a pressure suitable for the injector 22. The injector 22 can be any injector suitable for the purposes discussed herein. One example is an injector/ejector as described in U.S. Pat. No. 7,320,840, titled, Combination of Injector/Ejector for Fuel Cell Systems, issued Jan. 22, 2008, assigned to the assignee of this application and herein incorporated by reference.

An anode effluent output gas is output from the anode side of the fuel cell stack 12 on an anode output line 26, which is provided to a bleed valve 28. As is well understood by those skilled in the art, nitrogen cross-over from the cathode side of the fuel cell stack 12 dilutes the hydrogen gas in the anode side of the stack 12, thereby affecting fuel cell stack performance. Therefore, it is necessary to periodically bleed the anode effluent gas from the anode sub-system to reduce the amount of nitrogen in the anode sub-system. When the system 10 is operating in a normal non-bleed mode, the bleed valve 28 is in a position where the anode effluent gas is provided to a recirculation line 30 that recirculates the anode gas to the injector 22 to operate it as an ejector and provide recirculated hydrogen gas back to the anode input of the stack 12. When a bleed is commanded to reduce the nitrogen in the anode side of the stack 12, the bleed valve 28 is positioned to direct the anode effluent gas to a by-pass line 32 that combines the anode effluent gas with the cathode exhaust gas on the line 18, where the hydrogen gas is diluted to be suitable for the environment. Although the system 10 is an anode recirculation system, the present invention will have application for other types of fuel cell systems including anode flow shift-systems, as would be well understood to those skilled in the art.

The fuel cell system 10 also includes an HFR circuit 40 that determines stack membrane humidity of the membranes in the stack 12 in a manner that is well understood by those skilled in the art. The HFR circuit 40 determines the high frequency resistance of the fuel cell stack 12 that is then used to determine the humidification of the cell membranes within fuel cell stack 12. The HFR circuit 40 operates by determining the ohmic resistance, or membrane protonic resistance, of the fuel cell stack 12. Membrane protonic resistance is a function of membrane humidification of the fuel cell stack 12.

The fuel cell system 10 also includes a cooling fluid flow pump 48 that pumps a cooling fluid through flow channels within the stack 12 and a cooling fluid loop 50 outside of the stack 12. A radiator 46 reduces the temperature of the cooling fluid flowing through the loop 50 in a manner well understood by those skilled in the art. The fuel cell system 10 also includes a controller 44 that controls the operation of the system 10. The controller 44 operates a water buffer model and a water transfer model of the type referred to above that estimate the stack water content and the water transfer in the WVT unit 34, respectively, based on several and various inputs from components in the system 10 including, but not limited to, the mass flow meter 36 and the temperature sensor 42. The controller 44 also receives the HFR measurement signal from the HFR circuit 40 and the RH measurement signal from the RH sensor 38, and may use these inputs to update the model as the WVT unit 34 degrades. As mentioned, the controller 44 controls the operation of the system 10, including the bleed valve 28, the compressor 14, the injector 22, the pump 48, etc.

The present invention proposes a system and method for determining whether an HFR measurement signal from the HFR circuit 40 has drifted or the circuit 40 has failed and/or whether an output from the RH sensor 38 has drifted or the sensor 38 has failed. More specifically, the techniques described below will identify three separate failures, including a sudden jump in the HFR measurement, a slow RH sensor or HFR measurement drift and a humidification rationality determination that determines whether the RH sensor or the HFR circuit are providing a signal indicative of a change in the water content when no change should be occurring. The controller 44 would operate various algorithms and methods to perform the various diagnostics and control as discussed below.

Figure 2:
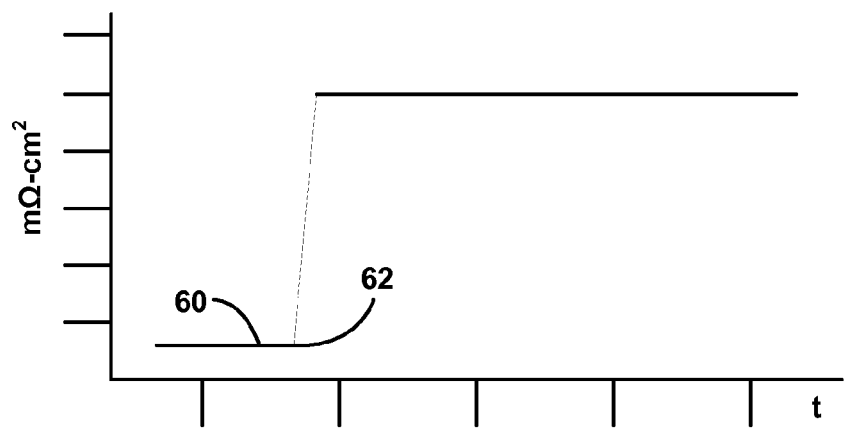
FIG. 2 is a graph with time on the horizontal axis and HFR measurement on the vertical axis showing an example of an indication of HFR circuit malfunction based on a sudden jump in HFR measurement.

The diagnostic for determining a sudden jump in the HFR humidification monitors the HFR measurement signal from the circuit 40 to determine if implausible values are being provided based on a sudden, physically impossible jump in the HFR measurement signal. The MEAs in the fuel cell stack 12 can only dry out so quickly based on mass transfer and second law considerations so that if a signal jump occurs that is faster than the theoretical drying rate of the membrane, it can be inferred that the HFR circuit 40 is not operating properly. FIG. 2 is a graph with time t in seconds on the horizontal axis and HFR measurement from the circuit 40 on the vertical axis showing possible occurrence. Graph line 60 shows a jump in the HFR measurement signal at location 62 to a level from, for example, about 50 mΩ-cm$^2$ to 500 mΩ-cm$^2$ in less than a second, which is an HFR measurement rate increase that would not be possible by the system physics. The maximum physical rate can be a function of the cathode air flow since that greatly influences the dry rate of the cell membranes. One remedial action that can be taken when this fault is detected is to discontinue adapting or modifying the water transfer model using the HFR measurement signal and ignore the HFR measurement signal. If the HFR signal comes back into line within the predictions from the stack water buffer, the diagnostic could be passed and normal model adaptation would resume.

The second diagnostic monitors a slow sensor or HFR measurement drift, where the drift may be able to be identified based on guard rails or limits that are put on the adaptation of the water transfer model. The WVT unit 34 should not operate with improved performance over time. Thus, if the HFR circuit 40 or the RH sensor 38 starts drifting in a manner indicating that the WVT unit 34 is transferring more water than theoretical or practically possible, a sensor fault diagnostic could be given. If the sensor 38 or the HFR circuit 40 were to drift the other way, such that the performance of the WVT unit 34 became worse, it may not be possible to tell if the sensor 38 or the HFR circuit 40 has failed or the WVT unit 34 has failed. In either circumstance, the diagnostic can set a flag that allows a service technician to determine which element is not operating correctly.

If the slow drift diagnostic is triggered as a result of too high or too low of an RH sensor reading or HFR circuit measurement, the water transfer model correction could be discontinued. Based on which limit was hit, the water transfer characteristics in the model could be changed. If the point is hit where the estimation is that the WVT unit 34 is transferring too much water based on a perceived erroneous sensor, then the WVT unit characteristics could be changed in the water transfer model so that it performs either to a fixed value somewhere in the acceptable humidifier performance range or a value corresponding to the number of hours the WVT unit 34 has been in operation. If the point is hit where the sensor 38 or HFR circuit 40 indicates that the WVT unit 34 is under performing, the water transfer model can be adapted at the low performing limit until service was able to determine the true malfunction.

Figure 3:
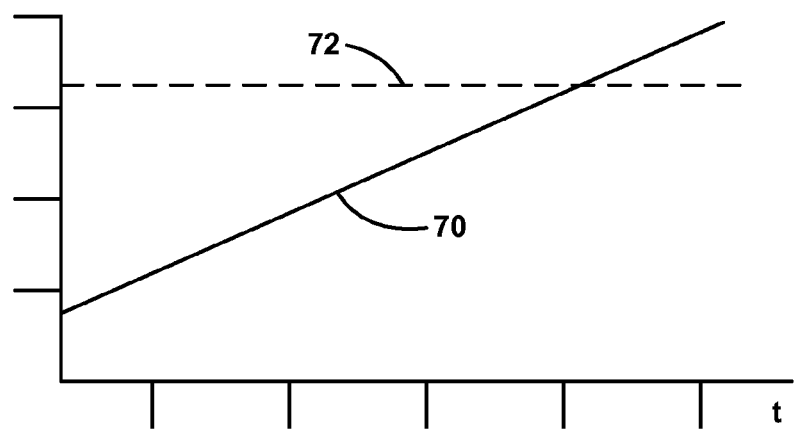
FIG. 3 is a graph with time on the horizontal axis and measured WVT unit water transfer rate on the vertical axis illustrating a slow RH sensor drift.

FIG. 3 is a graph with time t in hours on the horizontal axis and measured WVT unit performance on the vertical axis to show this diagnostic. Graph line 70 represents an increase the WVT unit performance overtime, where once a maximum possible humidifier performance is reached at line 72, the diagnostic can be implemented.

For the humidification rationality determination diagnostic, the HFR measurement value is higher or lower than it should be, but is neither a sudden jump nor a gradual drift. In this case, it is assumed that the HFR measurement value or the RH sensor value is providing an accurate reading, but the stack water content is changing based on that measurement when it should not be. Under this diagnostic, it is assumed that there is an issue with other system components, such as the air flow meter 36, which is causing the change in measured water content. In this diagnostic, the water transfer model is not used, but the actual HFR measurement or the RH sensor reading is used to determine stack water content. Diagnostics may be available for these other component failures, but for whatever reason have not yet been identified. In this case, the inputs to the water transfer model provided by the failing component may cause the model to provide an inaccurate RH estimation.

To determine if the HFR circuit 40 is providing a reasonable measurement, the difference between the HFR measurement and a predicted HFR measurement based on the stack water buffer model can be observed. If the difference is too high for a certain time period, the controller 44 can set a fault that would indicate a mismatch between the sensor readings and the model predictions. Because it is unknown which component in the system 10 is malfunctioning, it would not be possible to replace any of the values with more reasonable values. Action still would need to be taken to prevent stack dry-out or flooding. Before doing anything else, water transfer model adaptation needs to be disabled, regardless of whether the model adapts to the HFR measurement or the RH sensor measurement. Beyond that, the strategy would be to resort to an HFR based humidification control. Combining the HFR measurement with other operating parameters, such as coolant temperature, cathode air flow, cathode pressure, etc., through known techniques allows the control to estimate the humidification of the stack 12. The humidification set-point could be formulated so that the stack 12 does not run too wet or too dry. When a cell membrane is fully saturated with water, continuing to increase the degree of super-saturation of the cathode stream will not be measured by the HFR circuit 40. The effectiveness of the HFR measurement signal to determine humidification is much better at dryer conditions, such as below 100% RH. Since it is not known what component failed, this strategy will not ensure that the system 10 would run exactly where it would for the best performance.

Typically there is a lower limit for coolant temperature set-point, such as 40-50° C., because lower temperatures typically mean lower performance. The conductivity of the membrane decreases with decreasing temperature. Electrode kinetics become more sluggish at low temperatures. Because sensor errors may be severe in the case where the diagnostic is tripped, it may be necessary to have the ability to reduce the minimum temperature set-point to ensure humidification control to a reasonable level. The humidification needs are balanced with the need to keep some level of performance. Since there are faults in the system, the normal power capability of the system may not be available.

Figure 4:
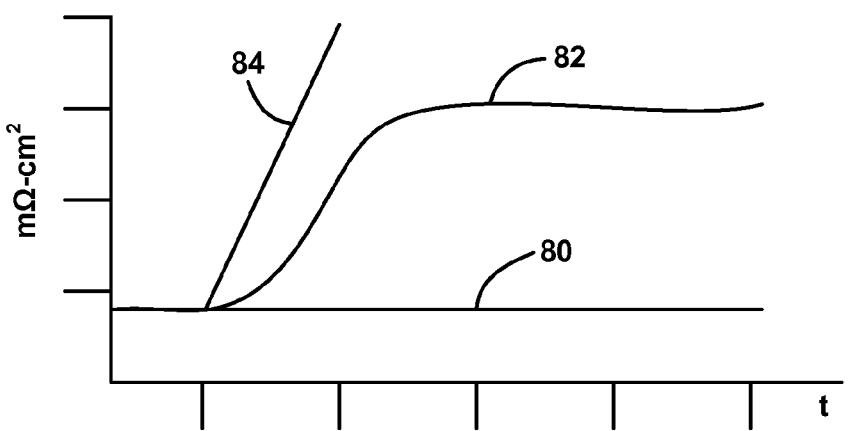
FIG. 4 is a graph with time on the horizontal axis and HFR measurement on the vertical axis showing an example of a humidification rationality diagnostic.

FIG. 4 is a graph with time t in seconds on the horizontal axis and HFR measurement on the vertical axis illustrating this diagnostic. In this illustration, the estimated HFR measurement for a particular steady-state system operation is shown by graph line 80 and the actual HFR measurement signal during that time is shown by graph line 82, where graph line 84 represents the maximum HFR increase rate possible. In this diagnostic it is assumed that the HFR measurement is correct and because the model based estimate is steady, it is also assumed that some component in the system has failed or otherwise malfunctioned.

Figure 5:
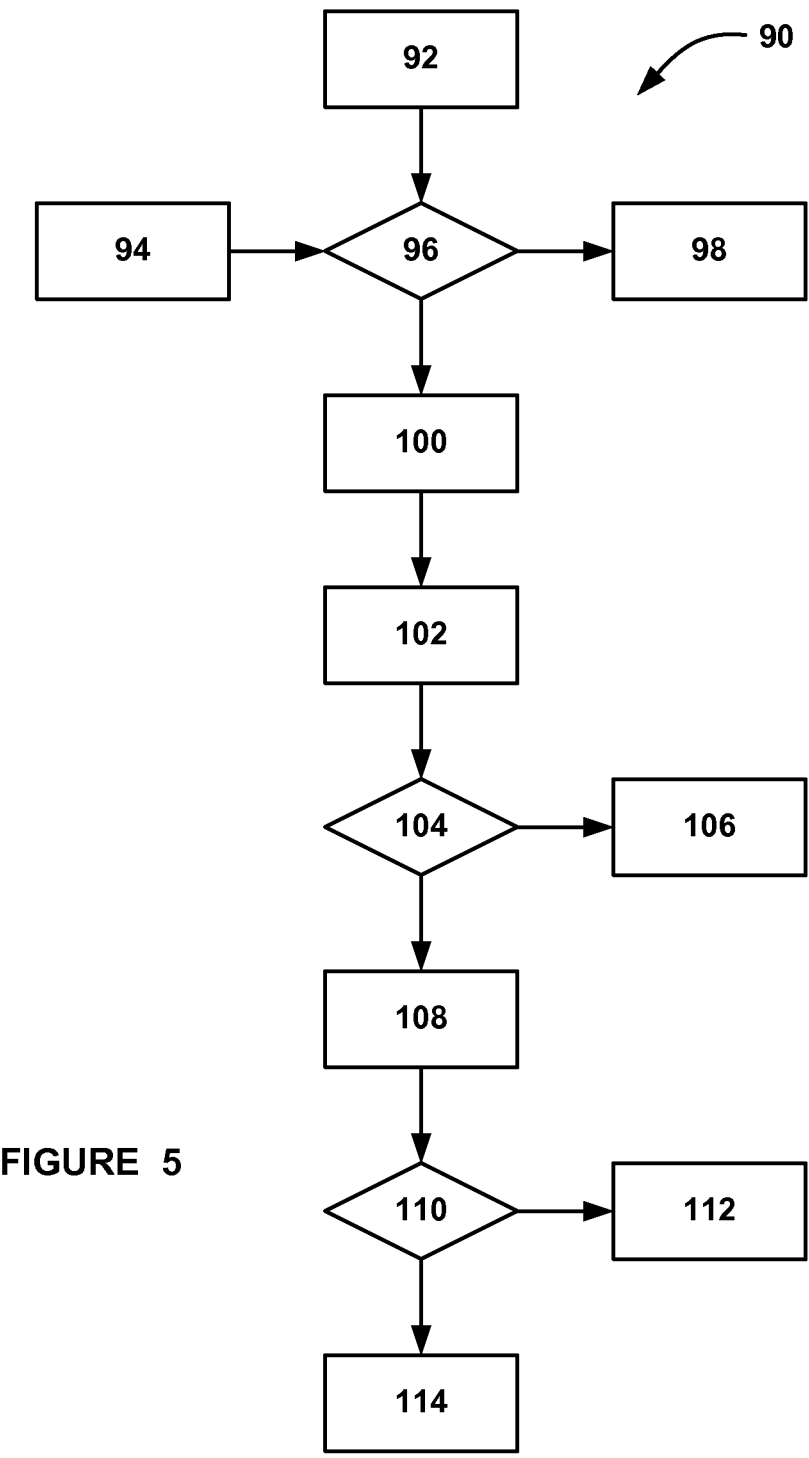
FIG. 5 is a flow chart diagram showing a process for determining if the RH sensor or the HFR circuit are operating properly.

FIG. 5 is a flow chart diagram 90 showing a process for determining if the RH sensor 38 and/or the HFR circuit 40 are operating properly based on the discussion above. An HFR circuit measurement at time t at box 92 and at time t−δt at box 94 are provided to a comparison diamond 96 to determine if the HFR measurement has increased beyond a maximum calculated possible rate. If so, the algorithm sets a fault at box 98 indicating that the HFR circuit measurement is not valid and should not be used. If the difference between the two HFR circuit measurement readings is a physically possible value at the comparison diamond 96, the algorithm determines that the HFR measurement is valid at box 100. The algorithm then compares an adapted WVT unit performance metric to a maximum expected metric at box 102, and determines if that comparison is higher than a predetermined maximum performance metric at decision diamond 104. If the algorithm determines that the performance of the WVT unit 34 is better than is reasonably possible at the decision diamond 104, the algorithm faults the RH sensor 38 or the HFR circuit 40 that was used to adapt the water transfer model at box 106. If the performance of the WVT unit 34 is acceptable at the decision diamond 104, then the algorithm compares the estimated water content in the stack 12 from the water buffer model to the HFR circuit measurement at box 108, and determines whether it is within a predetermined range at decision diamond 110. If it is within the predetermined range at the decision diamond 110, then the HFR measurement matches the model estimate and the system is working properly at box 112. If the comparison is not within the predetermined range at the decision diamond 110, then the algorithm provides a fault indicating some system component is not operating properly, and runs predetermined mitigation strategies at box 114.

It is noted that all of the embodiments discussed above are directed to a fuel cell system that includes a WVT unit for humidifying the cathode inlet air. However, it is known in the art to humidify the cathode inlet air directly using the oxygen depleted cathode exhaust gas without the need for a WVT unit. Both designs have advantages. One skilled in the art would readily recognize how the "sudden jump" diagnostic and the "rationality determination" diagnostic as discussed above could be modified for those systems that do not employ a WVT unit, but instead include a cathode recirculation design. For example, instead of using a WVT model to predict the amount of water content returning to the cathode inlet, another model or measurement that could be used that determines the recirculation flow.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for identifying a failure of determining water content in a fuel cell stack, said method comprising:
providing a cathode air flow to a cathode side of the fuel cell stack;
providing a cathode outlet gas to the cathode air flow to provide humidification for increasing the water content of the cathode inlet air;
providing a high frequency resistance (HFR) humidification signal from an HFR circuit that determines water content in the fuel cell stack;
providing a relative humidity (RH) signal from an RH sensor that measures the RH in the cathode air flow;
using a water buffer model for determining the water content of the fuel cell stack based on inputs from a plurality of system components;
using a water transfer model for determining the amount of water transferred to the cathode air flow using water content estimates from the water buffer model;
revising the water transfer model using the HFR humidification signal or the RH signal; and
determining whether the RH sensor or the HFR circuit is operating properly.

2. The method according to claim 1 wherein determining whether the HFR circuit is operating properly includes determining that the HFR circuit is not operating properly if a change in the HFR signal shows a decrease in the water of content of the stack that is greater than how fast it is possible for the water content of the stack to change.

3. The method according to claim 2 wherein revising the water transfer model includes preventing revising the water transfer model using the HFR signal if the HFR circuit is not operating properly.

4. The method according to claim 1 wherein providing a cathode air flow to a cathode side of the fuel cell stack includes flowing the cathode air flow through a water vapor transfer (WVT) unit prior to entering the fuel cell stack that increases a water content of the cathode air flow, and wherein revising the water transfer model using the HFR humidification signal or the RH signal includes correcting for WVT unit degradation.

5. The method according to claim 4 wherein determining whether the RH sensor or the HFR circuit is operating properly includes determining that the RH sensor or the HFR circuit is not operating properly if the water transfer model indicates that the WVT unit is improving in performance beyond a predetermined limit.

6. The method according to claim 5 wherein revising the water transfer model includes revising the water content model using a predetermined value if the RH sensor or the HFR circuit is not operating properly.

7. The method according to claim 5 wherein revising the water transfer model includes revising the water transfer model using a value based on the number of hours that the WVT unit has been in operation if the RH sensor or the HFR circuit is not operating properly.

8. The method according to claim 4 wherein determining whether the RH sensor or the HFR circuit is operating properly includes determining that the RH sensor or the HFR circuit is not operating properly if the water transfer model indicates that the performance of the WVT unit is below a predetermined performance for a certain point in time.

9. The method according to claim 8 wherein revising the water transfer model includes revising the water transfer model using the RH sensor reading or the HFR circuit measurement even though the water transfer model indicates that the performance of the WVT unit is below the predetermined performance.

10. The method according to claim 1 further comprising determining that one of the system components is not operating properly if it is determined that the HFR circuit or the RH sensor is operating properly but the water buffer model indicates that the stack water content is changing when it should not be.

11. The method according to claim 10 wherein using the water transfer model includes preventing using the water transfer model to determine stack water content and using the HFR signal to determine stack water content.

12. A method for identifying a failure of determining water content in a fuel cell stack, said method comprising:
providing a cathode air flow to a cathode side of the fuel cell stack, said cathode air flow flowing through a water vapor transfer (WVT) unit prior to entering the fuel cell stack that increases a water content of the cathode air flow;
providing a cathode outlet gas to the WVT unit to provide humidification for increasing the water content of the cathode inlet air;
providing a high frequency resistance (HFR) humidification signal from an HFR circuit that determines water content in the fuel cell stack;
using a water buffer model for determining the water content of the fuel cell stack based on inputs from a plurality of system components;
using a water transfer model for determining the amount of water transferred through the WVT unit using water content estimates from the water buffer model;
revising the water transfer model using the HFR humidification signal to correct for WVT unit degradation; and
determining that the HFR circuit is not operating properly if a change in the HFR signal is greater than how fast it is possible for the water content of the stack to change.

13. The method according to claim 12 wherein revising the water transfer model includes preventing revising the water transfer model using the HFR signal if the HFR circuit is not operating properly.

14. The method according to claim 12 further comprising determining that one of the system components is not operating properly if it is determined that the HFR circuit is operating properly but the water buffer model indicates that the stack water content is changing when it should not be.

15. The method according to claim 14 wherein using the water transfer model includes preventing using the water transfer model to determine stack water content and using the HFR signal to determine stack water content.

16. A method for identifying a failure of determining water content in a fuel cell stack, said method comprising:
providing a cathode air flow to a cathode side of the fuel cell stack, said cathode air flow flowing through a water vapor transfer (WVT) unit prior to entering the fuel cell stack that increases a water content of the cathode air flow;

providing a cathode outlet gas to the WVT unit to provide humidification for increasing the water content of the cathode inlet air;

providing a high frequency resistance (HFR) humidification signal from an HFR circuit that determines water content in the fuel cell stack;

providing a relative humidity (RH) signal from an RH sensor positioned between the WVT unit and the fuel cell stack that measures the RH in the cathode inlet air;

using a water buffer model for determining the water content of the fuel cell stack based on inputs from a plurality of system components;

using a water transfer model for determining the amount of water transferred through the WVT unit using water content estimates from the water buffer model;

revising the water transfer model using the HFR humidification signal or the RH signal to correct for WVT unit degradation; and determining whether the RH sensor or the HFR circuit is operating properly includes determining that the RH sensor or the HFR circuit is not operating properly if the water transfer model indicates that the WVT unit is improving in performance beyond a predetermined limit.

17. The method according to claim 16 wherein revising the water content model includes revising the water transfer model using a predetermined value if the RH sensor or the HFR circuit is not operating properly.

18. The method according to claim 16 wherein revising the water transfer model includes revising the water transfer model using a value based on the number of hours that the WVT unit has been in operation if the RH sensor or the HFR circuit is not operating properly.

19. The method according to claim 15 wherein determining whether the RH sensor or the HFR circuit is operating properly includes determining that the RH sensor or the HFR circuit is not operating properly if the water transfer model indicates that the performance of the WVT unit is below a predetermined performance for a certain point in time.

20. The method according to claim 19 wherein revising the water transfer model includes revising the water transfer model using the RH sensor reading or the HFR circuit measurement even though the water content model indicates that the performance of the WVT unit is below the predetermined performance.

* * * * *